(12) United States Patent
Yamasaki et al.

(10) Patent No.: US 12,387,367 B2
(45) Date of Patent: Aug. 12, 2025

(54) IMAGE DISPLAY DEVICE

(71) Applicant: NTT DOCOMO, INC., Chiyoda-ku (JP)

(72) Inventors: Takeo Yamasaki, Chiyoda-ku (JP); Takayuki Tamura, Chiyoda-ku (JP); Yuuki Takaya, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 519 days.

(21) Appl. No.: 17/758,607

(22) PCT Filed: Jan. 6, 2021

(86) PCT No.: PCT/JP2021/000221
§ 371 (c)(1),
(2) Date: Jul. 11, 2022

(87) PCT Pub. No.: WO2021/145255
PCT Pub. Date: Jul. 22, 2021

(65) Prior Publication Data
US 2023/0039690 A1 Feb. 9, 2023

(30) Foreign Application Priority Data
Jan. 14, 2020 (JP) .................... 2020-003639

(51) Int. Cl.
*G06T 19/00* (2011.01)
*G01B 11/02* (2006.01)
*G06T 7/73* (2017.01)

(52) U.S. Cl.
CPC .............. *G06T 7/73* (2017.01); *G01B 11/026* (2013.01); *G06T 2207/30204* (2013.01)

(58) Field of Classification Search
CPC ............. G06T 7/73; G06T 2207/30204; G06T 19/006; G01B 11/026; G06F 3/011
See application file for complete search history.

(56) References Cited

U.S. PATENT DOCUMENTS

2019/0012799 A1    1/2019  Tsurumi

FOREIGN PATENT DOCUMENTS

| JP | 2008-293209 A | 12/2008 |
| JP | 2019-66293 A | 4/2019 |
| JP | 2019066293 A * | 4/2019 |

OTHER PUBLICATIONS

International Search Report mailed on Apr. 13, 2021 in PCT/JP2021/000221 filed on Jan. 6, 2021 (2 pages).

(Continued)

*Primary Examiner* — Said M Elnoubi
(74) *Attorney, Agent, or Firm* — Oblon, McClelland, Maier & Neustadt, L.L.P.

(57) ABSTRACT

An object is to provide an image display device capable of correcting a position in a simple manner even when a deviation occurs in position alignment in accordance with movement of a user. The image display device 100 includes a correction processing unit 102 that corrects a deviation when the deviation occurs between image data G and a steel frame T in a field of vision of a user U that occurs in accordance with movement of the user. This correction processing unit 102 acquires a coordinates correction position S that becomes a reference position used for a correction process from the steel frame T1 or the like that is a partial member using design data stored by a storage unit 103 and a self-position of the user U with respect to the steel frame T. The correction processing unit 102 performs correction by performing position alignment of the image data G on the basis of the one coordinates correction position S.

14 Claims, 11 Drawing Sheets

(56) References Cited

OTHER PUBLICATIONS

Japanese Office Action issued Aug. 20, 2024 in Japanese Patent Application No. 2021-571157 (with unedited, machine-generated English translation), 10 pages.
Extended European Search Report issued Apr. 14, 2023 in European Patent Application No. 217410703, 8 pages
International Preliminary Report on Patentability and Written Opinion issued Jul. 28, 2022, in PCT/JP2021/000221, 5 pages.
Combined Chinese Office Action and Search Report issued Feb. 27, 2025 in Chinese Patent Application No. 202180008752.0 (with unedited computer-generated English Translation of Office Action), 17 pages

* cited by examiner

*Fig.1*
(a)
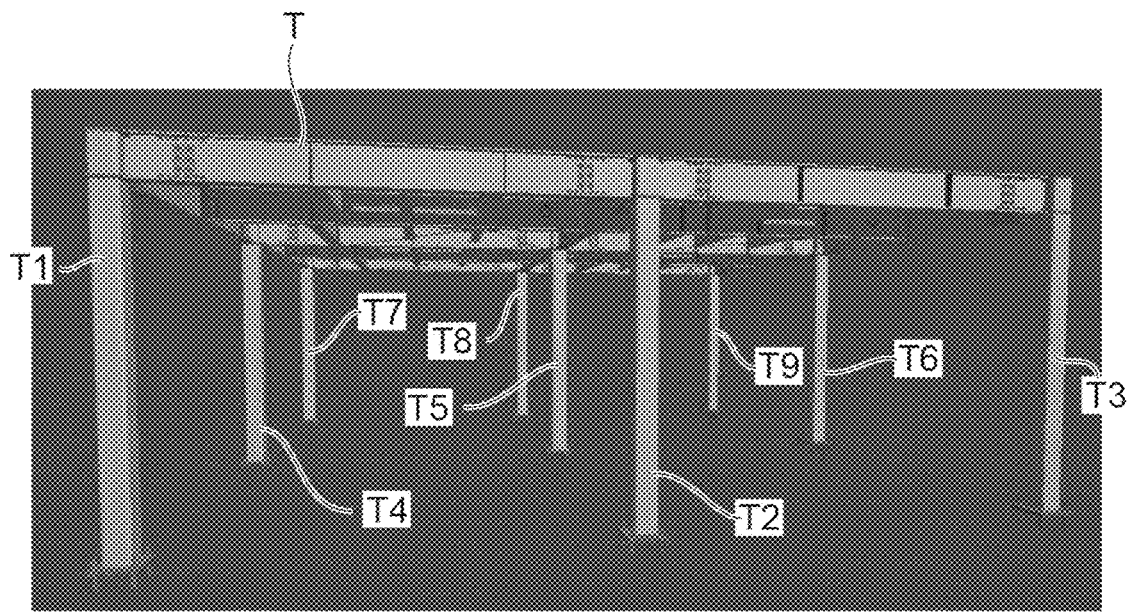
(b)
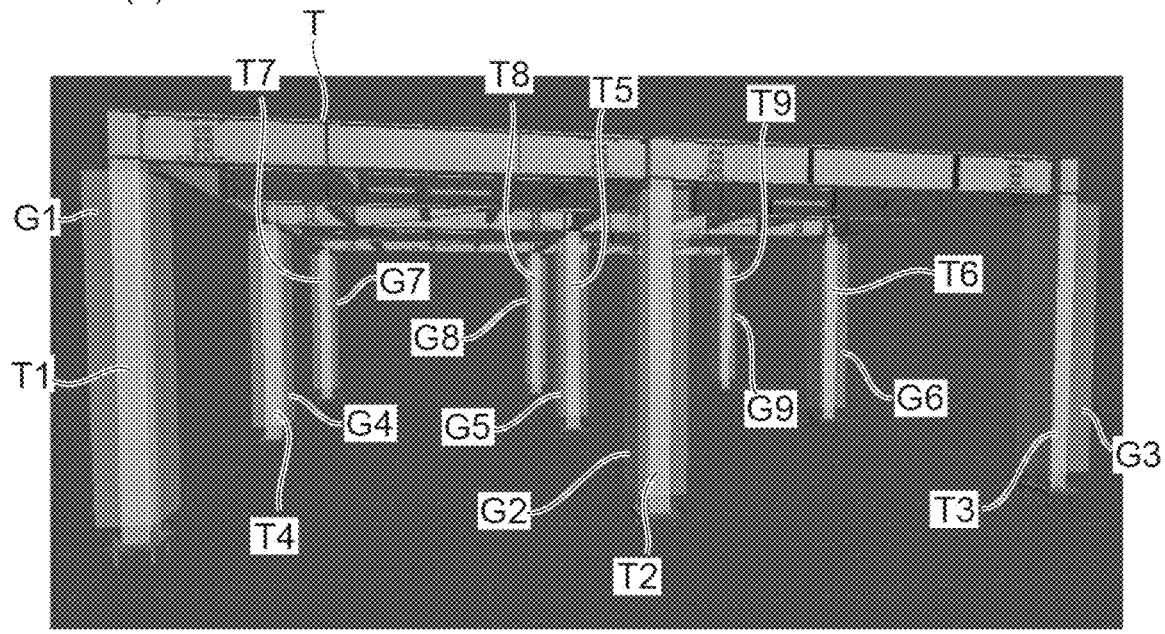

Fig.2
(a)
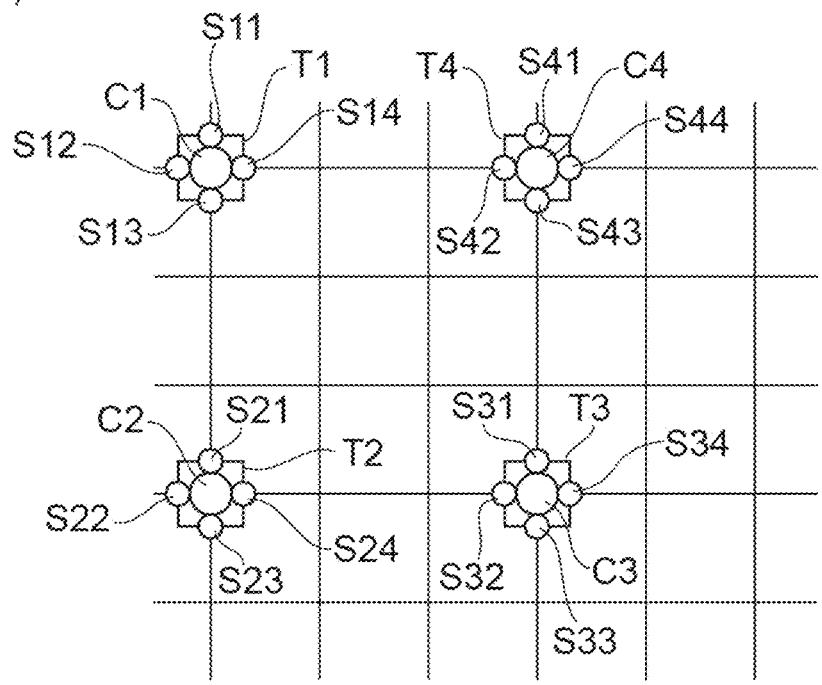
(b)
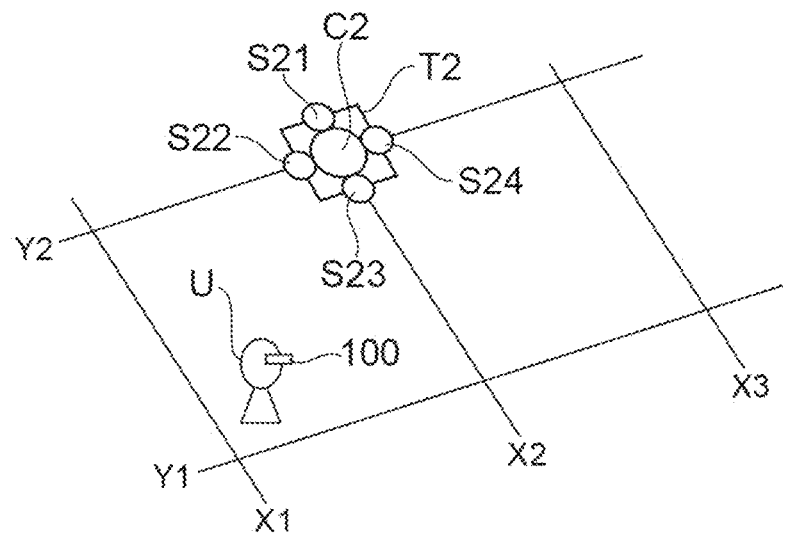

Fig.3
(a)
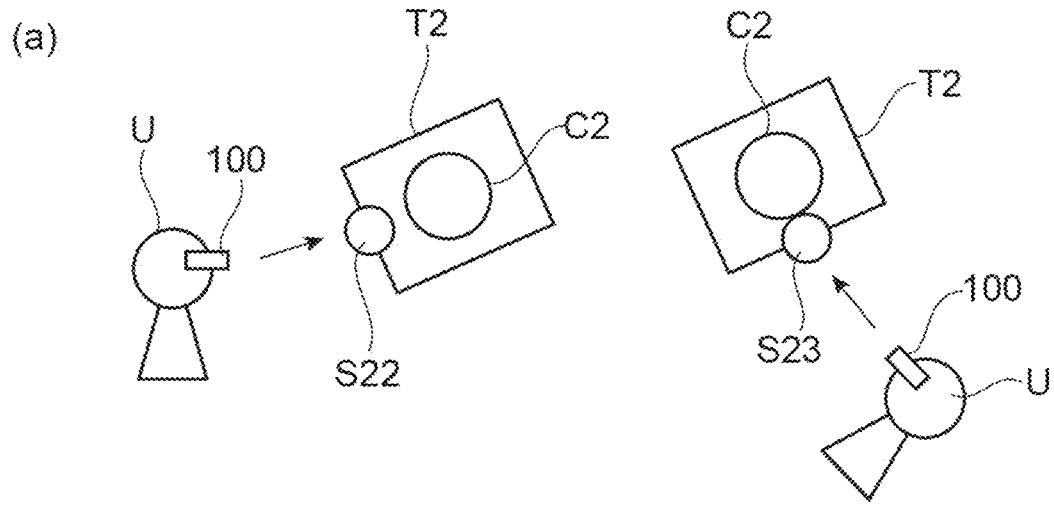
(b)
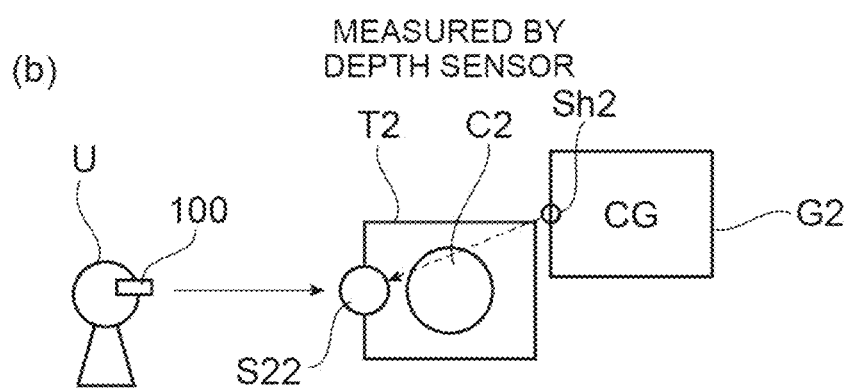
(c)
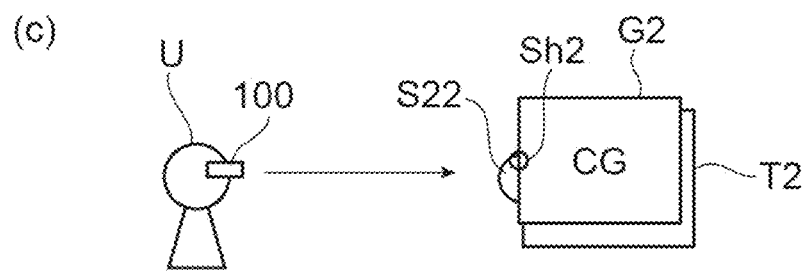

IMAGE DISPLAY DEVICE

TECHNICAL FIELD

The present invention relates to an image display device that uses a composite reality space (mixed reality (MR)).

BACKGROUND ART

Composing an image with an object present in a reality space using MR technologies is known. For example, in Patent Literature 1, overlapping representation of a reality-space image and a virtual-space image is described.

CITATION LIST

Patent Literature

[Patent Literature 1] Japanese Unexamined Patent Publication No. 2008-293209

SUMMARY OF INVENTION

Technical Problem

In recent years, enabling easy perception of a finished product by composing image data of decorative materials and the like with structures of only frames, beams, or the like in a construction stage of a building by using MR technologies has been conceived.

However, a case in which it is difficult to perform position alignment of the image data in a structure frequently occurs. Generally, it is conceivable to perform position alignment of image data by attaching a marker to a structure. In that case, when a user wearing goggles enabling viewing in an MR space such as MR goggles moves by moving away from a structure to which a marker is attached, a deviation in the position alignment between the structure and the image data occurs. For this reason, it may be conceivable to dispose markers corresponding to positions throughout the structure, but much labor would be required for setting and disposing such markers corresponding to the positions.

Thus, in order to solve the problems described above, an object is to provide an image display device capable of correcting a deviation in position alignment, which occurs when a user moves in a composite space, in a simple manner.

Solution to Problem

According to the present invention, there is provided an image display device that composes and displays a predetermined image for a composition target object present in a reality space, the image display device including: a storage unit configured to store design data representing a positional relation between parts of the composition target object; a display unit configured to generate and displays a composed image acquired by composing a predetermined image using one part of the composition target object as a reference position; and a correction unit configured to correct a deviation between the predetermined image and the composition target object that occurs in accordance with movement of a user, in which the correction unit acquires a coordinates correction position that becomes a reference position used for a correction process in the one part of the composition target object using the design data and a self-position of the user with respect to the composition target object and corrects a composition position of the predetermined image on the basis of the coordinates correction position.

Advantageous Effects of Invention

According to the present invention, a deviation in position alignment in a composite reality space can be corrected in a simple manner.

BRIEF DESCRIPTION OF DRAWINGS

FIG. 1 illustrates a view of steel frames T that are structures according to this embodiment and a view acquired by composing image data G of columns with the steel frames T.

FIG. 2 is an explanatory diagram of coordinates correction positions.

FIG. 3 is an explanatory diagram illustrating a composition process using the coordinates correction positions.

DESCRIPTION OF EMBODIMENTS

Figure 4:
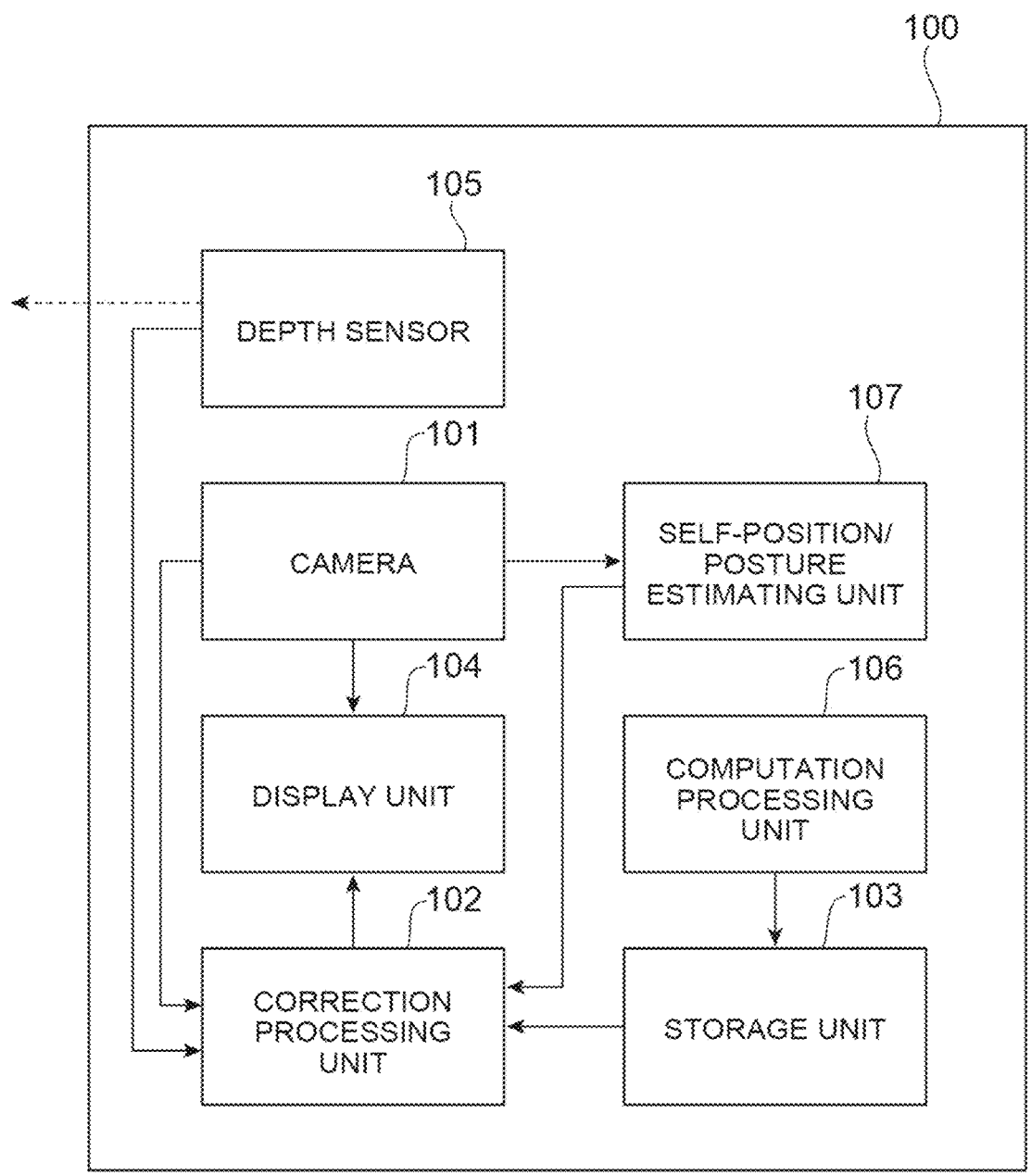
FIG. 4 is a block diagram illustrating a functional configuration of an image display device 100.

An embodiment of the present invention will be described with reference to the attached drawings. If possible, the same reference signs will be assigned to the same parts, and duplicate description will be omitted.

FIG. 1 illustrates a view of steel frames T that are structures according to this embodiment and a view acquired by composing image data G of decorative materials indicating columns with the steel frames T. FIG. 1 illustrates a view that can be seen by a user wearing MR goggles that are an image display device according to this embodiment. FIG. 1(*a*) is a view illustrating steel frames T that are structures present in a reality space before composition of image data G of decorative materials. In FIG. 1, the steel frames T are composed of steel frames T to Tn. In FIG. 1, although steel frames up to a steel frame T9 are illustrated, it is apparent that steel frames up to a steel frame Tn (here, n is a natural number) may be present. This similarly applies also to image data Gn (here, n is a natural number; for example, G1 to G9).

In this embodiment, although columns are formed as steel frames, the columns are not limited to steel frames and may be concrete columns or may be in a state of being covered with decorative materials. An image that is composed and displayed is not limited to an image of a decorative material and may be configured as an image of a pipe arrangement, a wiring, furniture, or the like.

FIG. 1(b) is a view representing a state in which actual steel frames T are covered with decorative materials used for decoration and is a view acquired when image data G representing the pieces of decorative material is composed with the steel frames T in a composite reality space. Design data indicating positions, sizes, and the like of the steel frames T1 to Tn and image data G1 to Gn of the pieces of decorative material are stored in advance. The image data G is a three-dimensional image composed of the image data G1 to Gn. The image data G1 to Gn of a plurality of decorative materials are associated in accordance with the positions of the steel frames T1 to Tn in advance.

A correction correspondence part corresponding to a coordinates correction position to be described below is set in each piece of image data Gn. For example, when composition is performed with a correction correspondence part of the image data G1 of a decorative material being aligned with the coordinates correction position set in the steel frame T1, image data G2 of another decorative material is also aligned in position with a corresponding steel frame T2. Similarly, the image data Gn and the like of other pieces of decorative materials are aligned in position with corresponding steel frames Tn. However, an error may be included in the alignment in position of correction correspondence parts of the image data G2 and the like with the coordinates correction positions set in the steel frame T2 and the like.

When the steel frames T and the image data G of the decorative material of the steel frames T are initially aligned in position, for example, an initial marker used for the image data G1 is attached to a predetermined place on the steel frame T1, whereby position alignment is performed. The image data G2 and the like configure image data G of which a mutual positional relation is fixed, and thus the other steel frames T2 and the like are automatically aligned in position. In addition, the image data G is a three-dimensional image, and thus, this image data G is rotated in accordance with a direction in which a user sees the steel frame T. In this way, by performing position alignment on the basis of the initial marker, position alignment between all the steel frames T1 to Tn and the image data G1 to Gn can be performed.

The position alignment will be additionally described in detail. FIG. 2 is an explanatory diagram of coordinates correction positions. In FIG. 1, performing only position alignment is shown. As illustrated in FIG. 2, the steel frame T1 has faces in four directions. The position alignment of the image data G1 of the decorative material is performed using one of the faces of the steel frame T as a reference. The coordinates correction position represents a reference position used for position alignment between the position of the steel frame T and the image data G of the decorative material.

FIG. 2(a) is a schematic view acquired when viewing the upper face of the steel frame T. In this embodiment, this steel frame T is a prism having an intersection C of base lines at the center thereof, and a cross-section thereof is a tetrahedron. Here, the steel frame T1 will be focused on. In faces of the steel frame T1, coordinates correction positions 511 to S14 are set.

When a user moves while viewing the steel frame T1, deviations in positions between other steel frames T2 to T4 (the decorative materials K2 to K4) and the image data G2 to G4 of the decorative materials occur. For this reason, in a case in which deviations occur, the deviations need to be corrected. In other words, when a user moves while seeing the steel frame T1, the reference marker that has been initially set disappears from the field of view, and tracking of the position/angle using this reference marker cannot be performed, and tracking using self-position/posture estimation using SLAM is performed. In this self-position/posture estimation, an estimation error occurs in accordance with movement.

In this embodiment, by identifying a steel frame T that is the nearest from a user and a coordinates correction position S thereof, the steel frame T that becomes a reference for correction is identified.

FIG. 2(b) is a view illustrating a steel frame T2 that is the nearest from a user U when the user U wearing an image display device 100, which represents MR goggles, moves and coordinates correction positions S21 to S24. In this embodiment, the image display device 100 can perceive a position of the user U with respect to the steel frame T, that is, a relative positional relation thereof by using a known self-position estimation technology.

In accordance with the user U seeing the steel frame T2, the image display device 100 determines one of the coordinates correction positions S21 to S24 of the steel frame T2 that is the nearest from the user U as a correction reference. As illustrated in FIG. 3(a), the image display device 100 selects a coordinates correction position S at which a reverse direction vector of a visual line direction of the user U (here, corresponding to an imaging direction of a camera in the image display device) and a normal line vector of a surface of the steel frame T are within a predetermined angle.

In addition, an actual coordinates correction position that is defined on the face of the steel frame T is calculated on the basis of a distance to the steel frame T measured using a depth sensor (FIG. 3(b)). The depth sensor may not always be able to measure from in front of the steel frame T. Thus, the coordinates correction position is corrected to a predetermined position (for example, a center part) on the surface of the steel frame T.

Then, a process of shifting a correction correspondence part Sh2 of the image data G is performed on the basis of the coordinates correction position (FIG. 3(c)). Image data G2 is associated with correction correspondence part information associated with each coordinates correction position S (a position S22 in FIG. 3) and relative positional information in the image data G. In other words, each face of each piece of image data G is associated with a coordinates correction position set in each face of each steel frame T and a reference position that is used for position alignment. By aligning the position of this correction correspondence part Sh2 with the coordinates correction position S12, the image data G and the steel frame T can be aligned in position.

By performing such a process, a user U can visually recognize a state in which the steel frame T is covered with the image data G of the decorative material while moving. In FIGS. 2 and 3, although the cross-section of the steel frame T is configured in a quadrangle shape, the configuration is not limited thereto. The cross-section may be configured in the shape of a circle or another polygon, and the coordinates correction position of the steel frame T and the correction correspondence part of the image data G of the decorative material may be associated with each other.

Next, a functional configuration of the image display device 100 according to this embodiment will be described. FIG. 4 is a block diagram illustrating the functional configuration of the image display device 100. As illustrated in the drawing, the image display device 100 is configured to include a camera 101, a correction processing unit 102 (a correction unit), a storage unit 103, a display unit 104, a depth sensor 105 (a sensor unit), a computation processing unit 106, and a self-position/posture estimating unit 107. This image display device 100 is a device that is so-called MR goggles and is a device of a head-mounted display type. By wearing this image display device 100 on the head, a user can see a video captured by the camera 101 through the display unit 104. In a head-mount display of a video see-through type, by wearing this image display device 100 on the head, a user can see a video captured by the camera 101 through the display unit 104. This embodiment is not limited to these forms and can be similarly realized using a device of an optical see through type (for example, steel frames are seen through glass).

The camera 101 is a part that images a reality space seen by a user.

The correction processing unit 102 is a part that composes image data that is a virtual space member with a video captured by the camera 101 in a composite reality space. Here, the correction processing unit 102 performs a process for composing image data G representing decorative materials with steel frames T and a correction process at the time of a positional deviation.

The storage unit 103 is a part that stores design data of structures such as steel frames T and image data G representing decorative materials for the structures. The design data is information representing a size of each steel frame T, a gap between steel frames, and the like. In addition, the image data G has information representing a correspondence relation with a steel frame T (particularly, a coordinates correction position and the like) in addition to the image of decorative materials.

The display unit 104 is a part that displays a video captured by the camera 101. In a case in which the image data G is composed with the steel frames T by the correction processing unit 102, the display unit 104 displays the composed video.

The depth sensor 105 is a sensor that measures a distance between a user U and a steel frame T.

The computation processing unit 106 is a part that calculates an initial position of a relative positional relation of the image display device 100 with respect to the structure (the steel frame T) and a positional deviation between the steel frame T and the image data G that is generated when the user moves on the basis of the design data stored in the storage unit 103.

The self-position/posture estimating unit 107 is a part that estimates a position in a reality space that is captured and displayed by the camera 101 and a change in a posture of the image display device 100 on the basis of a video captured by the camera 101. By perceiving a direction in which the steel frame T is visually recognized and a relative distance thereof from a captured video on the basis of the initial position calculated by the computation processing unit 106, an image of an initial marker at that time, and the steel frame T that is being currently captured, the self-position/posture estimating unit 107 can estimate a current positional relation (a current position) relative to the steel frame T. This self-position/posture estimating unit 107 can be realized using a known technology, for example, simultaneous localization and mapping (SLAM). The self-position/posture estimation function is not limited thereto, and self-position estimation may be performed using a GPS or any other sensor.

Figure 5:
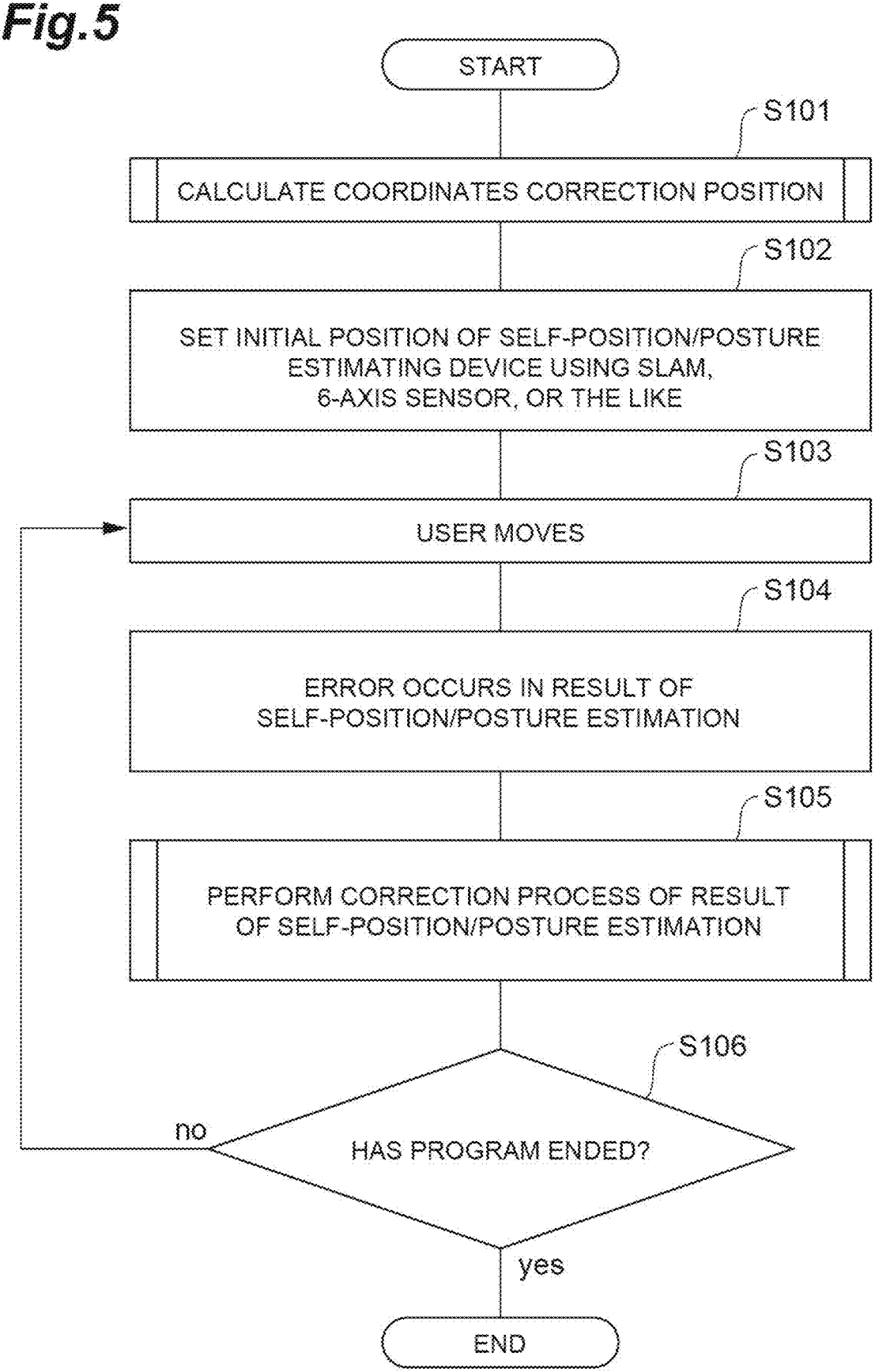
FIG. 5 is a flowchart illustrating operations of the image display device 100.

Operations of the image display device 100 configured in this way will be described. FIG. 5 is a flowchart illustrating the operations.

The computation processing unit 106 calculates a coordinates correction position S in each steel frame T on the basis of design data stored in the storage unit 103 and stores the calculated coordinates correction position in the storage unit 103 (S101).

Next, the computation processing unit 106 calculates an initial position of the self-position/posture estimating unit 107 and perceives a positional relation of the steel frame T (S102).

When a user moves (S103), an error occurs in the self-position/position estimation (S104).

Then, the correction processing unit 102 selects a coordinates correction position that becomes a reference from coordinates correction position candidates on the basis of the self-position estimated by the self-position/posture estimating unit 107. Then, the correction processing unit 102 corrects the position of the image data G of the decorative material on the basis of a result of the self-position estimation (the self-position) and the selected coordinates correction position (S105). These S103 to S106 are repeated until the program ends (S106).

Figure 6:
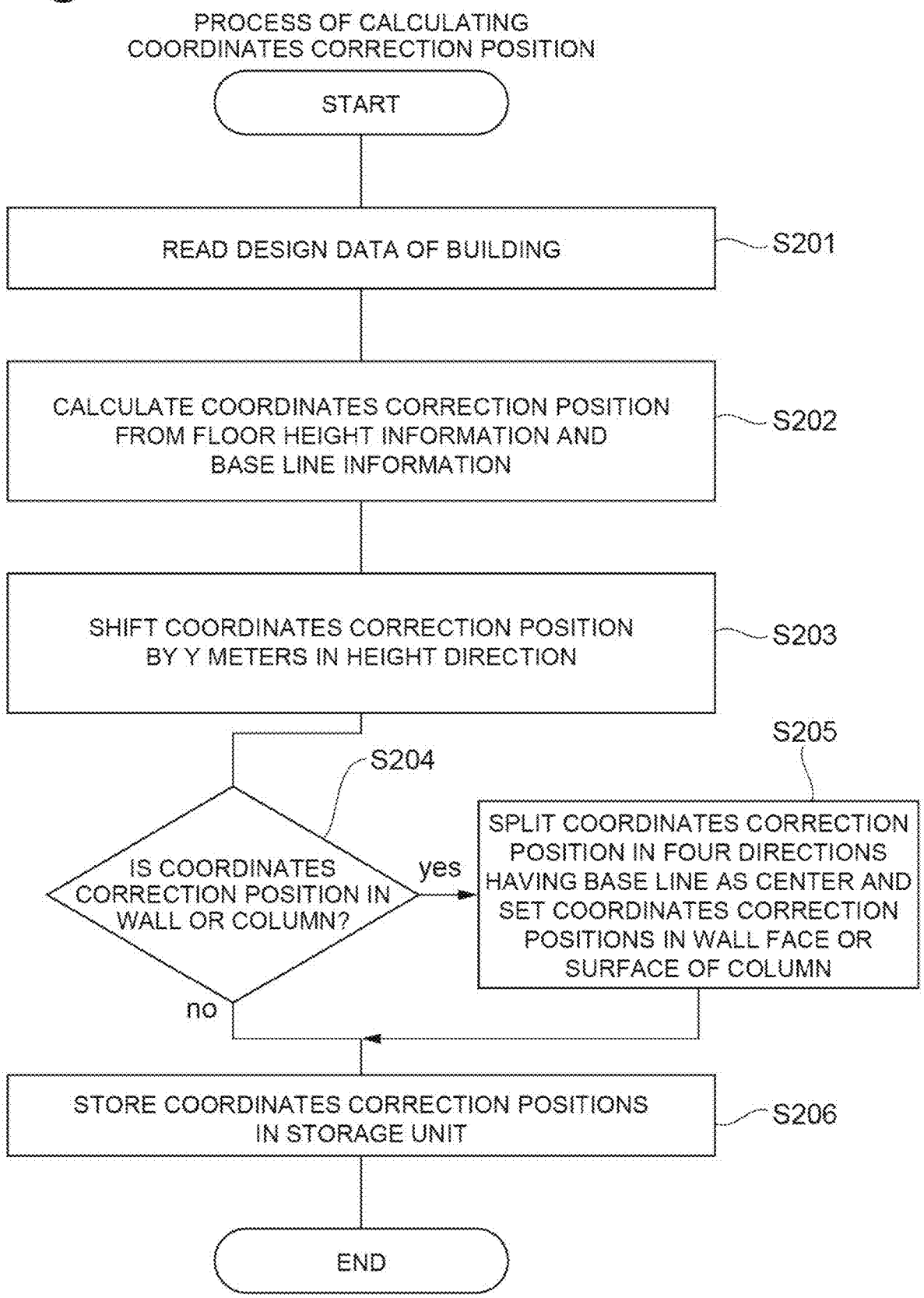
FIG. 6 is a flowchart illustrating detailed operations of a process S101.

FIG. 6 is a flowchart illustrating detailed operations of a process S101. The computation processing unit 106 reads design data of a building (the steel frame T) by referring to the storage unit 103 (S201). The computation processing unit 106 calculates a coordinates correction position from floor height information and base line information (S202). Here, the floor height information represents the number of stories and a height of a building. The base line information is information that indicates a center line of the steel frame and represents coordinates inside the building. The coordinates correction position is a position the becomes a reference for composing the image data G of a decorative material and, here, represents three-dimensional coordinates obtained from coordinates of a coordinates correction position defined at an intersection C of the base line and a height thereof.

The computation processing unit 106 sets a position acquired by shifting the coordinates correction position by Y meters in a height direction as a coordinates correction position (S203). This process is for the purpose of alignment with a position aligned with the eye line of a person.

The computation processing unit 106 determines whether or not the final coordinates correction position is present in a steel frame such as a wall or a column (S204). For example, it is determined that coordinates of an intersection of a base line (coordinates in a horizontal direction) are present inside the steel frame T. This similarly applies also to a case in which the steel frame T is buried in a wall. Such information is determined on the basis of sizes of steel frames T and an arrangement thereof included in the design data.

In a case in which it is determined that the coordinates correction position is present in the steel frame T, the computation processing unit 106 splits the coordinates correction position in four directions using the intersection of the base line set as a center, and calculates and sets intersections intersecting with the surface of the steel frame T in the design data as coordinates correction positions (S205).

The computation processing unit 106 stores the coordinates correction positions calculated on the basis of these processes in the storage unit 103 (S206). The storage unit 103 stores, for each of the steel frames T (the steel frames T1 to Tn), identification information of a decorative material associated therewith, an arrangement position (relative position information) of the decorative material, a correction correspondence part in image data G of the decorative material corresponding to the coordinates correction position set for each steel frame T, and image data G (image data G1 to Gn) of the decorative material in association with each other. In other words, the storage unit 103 stores various kinds of information such that image data G (G1 to Gn) to be composed is associated with each coordinates correction position of the steel frame T.

Figure 7:
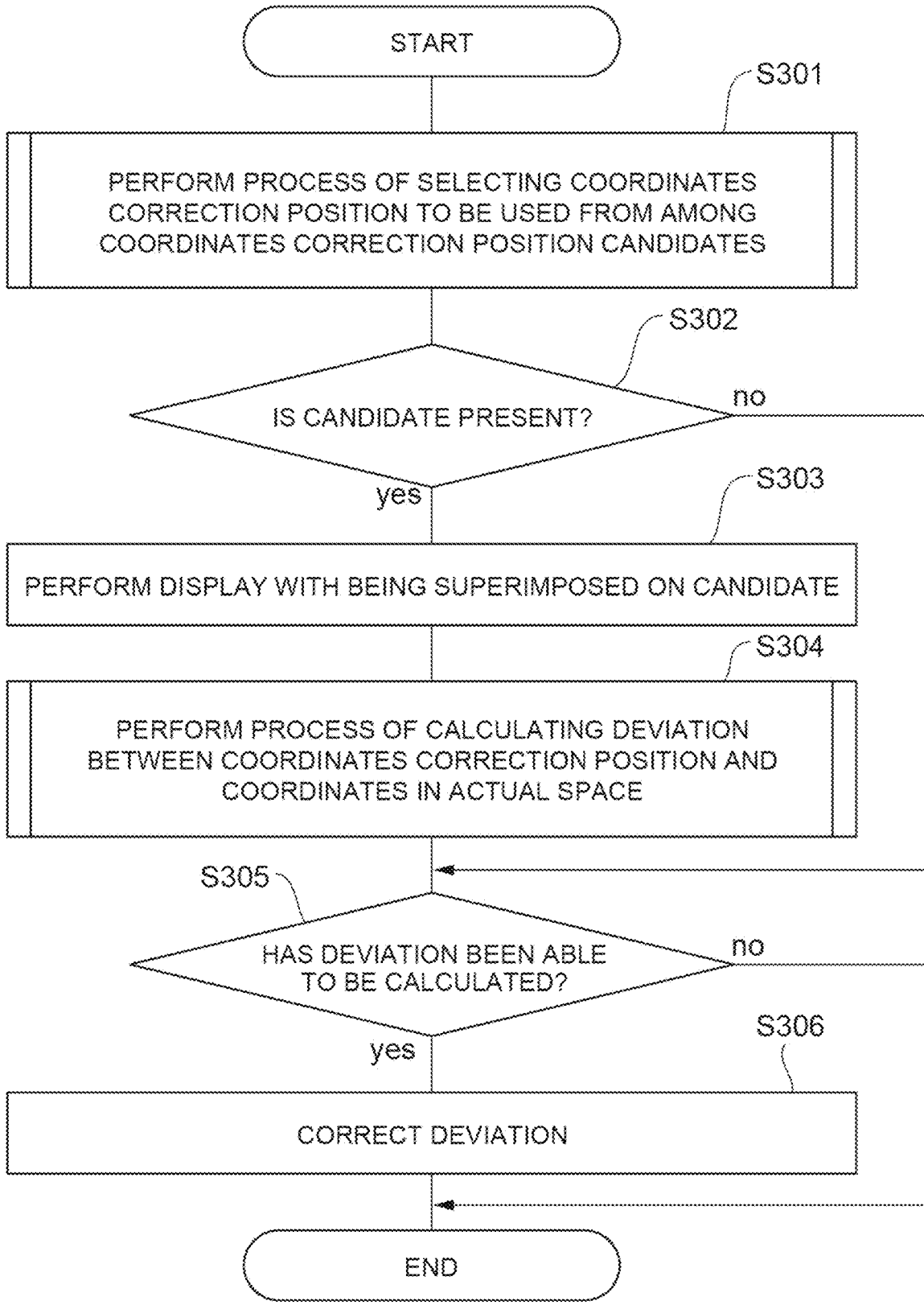
FIG. 7 is a flowchart illustrating detailed processes of a process of selecting a self-position/posture estimation result and a correction process performed by a correction processing unit 102.

Next, detailed processes of the process S105 will be described. FIG. 7 is a flowchart illustrating detailed processes of a process of selecting a self-position/posture estimation result and a correction process performed by the correction processing unit 102.

The correction processing unit 102 selects a coordinates correction position that becomes a reference from among coordinates correction position candidates stored in the storage unit 103 (S301). In a case in which a candidate is present, the correction processing unit 102 superimposes message information indicating a coordinates correction position on the basis of the selected coordinates correction position, and the display unit 104 displays an indication thereof (S303).

The correction processing unit 102 calculates a deviation of the coordinates correction position with coordinates in an actual space (S304). In other words, the correction processing unit 102 calculates a positional deviation between the coordinates correction position in the designated steel frame T and the image data G of a decorative material that is a composition target. For example, in FIG. 3(*b*), the depth sensor 105 measures a distance from a position obtained by shifting the height of the intersection C2 of the base line by Y to the surface (the coordinates correction position) of the steel frame T. The correction processing unit 102 calculates an actual position of the coordinates correction position on the basis of the distance. On the other hand, the correction processing unit 102 acquires a position (a position to be aligned with the coordinates correction position; here, the correction correspondence part) of the image data G2 of the decorative material and calculates a difference thereof as a positional deviation (error). The coordinates correction position is located at the position acquired through shift by Y in the height direction and at the center position of the thickness of the steel frame in the horizontal direction, and thus the position may be acquired through calculation or may be identified in accordance with a user's instruction using a user input function included in this device.

In a case in which a positional deviation (the deviation is equal to or larger than a predetermined value) is calculated (S305: Yes), the correction processing unit 102 corrects a superimposition position of the image data G in accordance with the deviation amount (S306).

Figure 8:
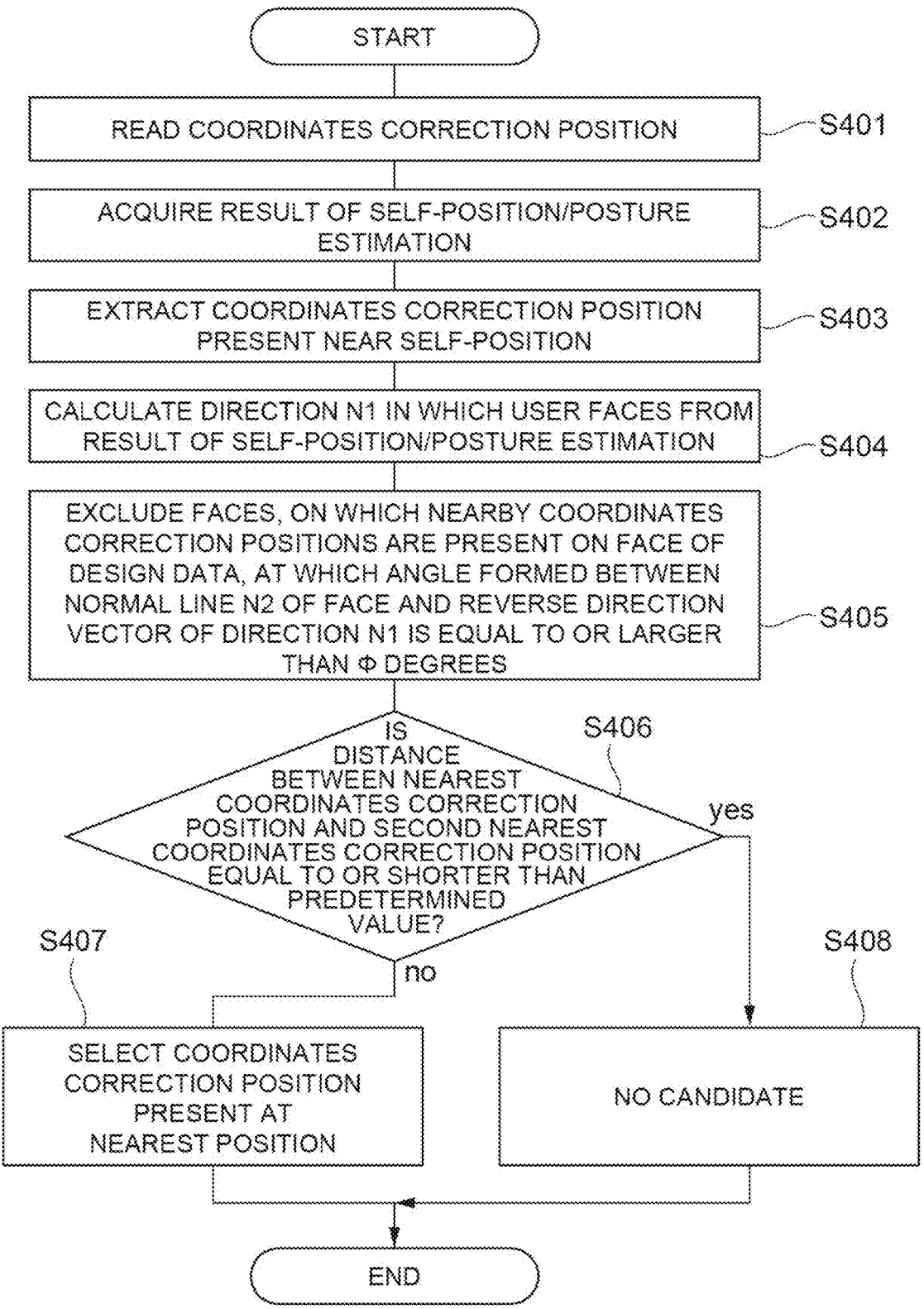
FIG. 8 is a flowchart illustrating a process of selecting a coordinates correction position to be used from coordinates correction position candidates.

Next, detailed processes of the process S301 represented in FIG. 7 will be described. FIG. 8 is a flowchart illustrating a process of selecting a coordinates correction position to be used from coordinates correction position candidates.

The correction processing unit 102 reads a coordinates correction position in the steel frame T from the storage unit 103 (S401) and acquires a result of self-position/posture estimation (relative self-position information to the steel frame T) performed by the self-position/posture estimating unit 107 (S402).

The correction processing unit 102 extracts a plurality of coordinates correction positions S present near (in a predetermined range) of the self-position on the basis of the result of the self-position/posture estimation (S403). In addition, the correction processing unit 102 calculates a direction N1 in which a user faces the steel frame T on the basis of the result of the self-position/posture estimation (S404). In other words, the self-position/posture estimating unit 107 calculates an angle formed between a direction vector of a normal line N2 of the surface of each steel frame T and a reverse direction vector of the direction N1.

The correction processing unit 102 excludes faces each having a coordinates correction position at which this angle is equal to or larger than y degrees. In other words, in a case in which the surfaces of steel frames T are seen in an inclining direction by a user, coordinates correction positions on the surfaces of the steel frames T are excluded (S405).

The correction processing unit 102 determines whether or not a distance between a coordinates correction position S that is the nearest and a coordinates correction position S that is the second nearest is shorter than a predetermined distance (S406). The correction processing unit 102 determines that there is no candidate in a case in which the distance is shorter than the predetermined distance (S408) and selects the nearest coordinates correction position S in a case in which the distance is equal to or longer than the predetermined distance (S407).

In accordance with this process, the correction processing unit 102 selects one coordinates correction position S.

Figure 9:
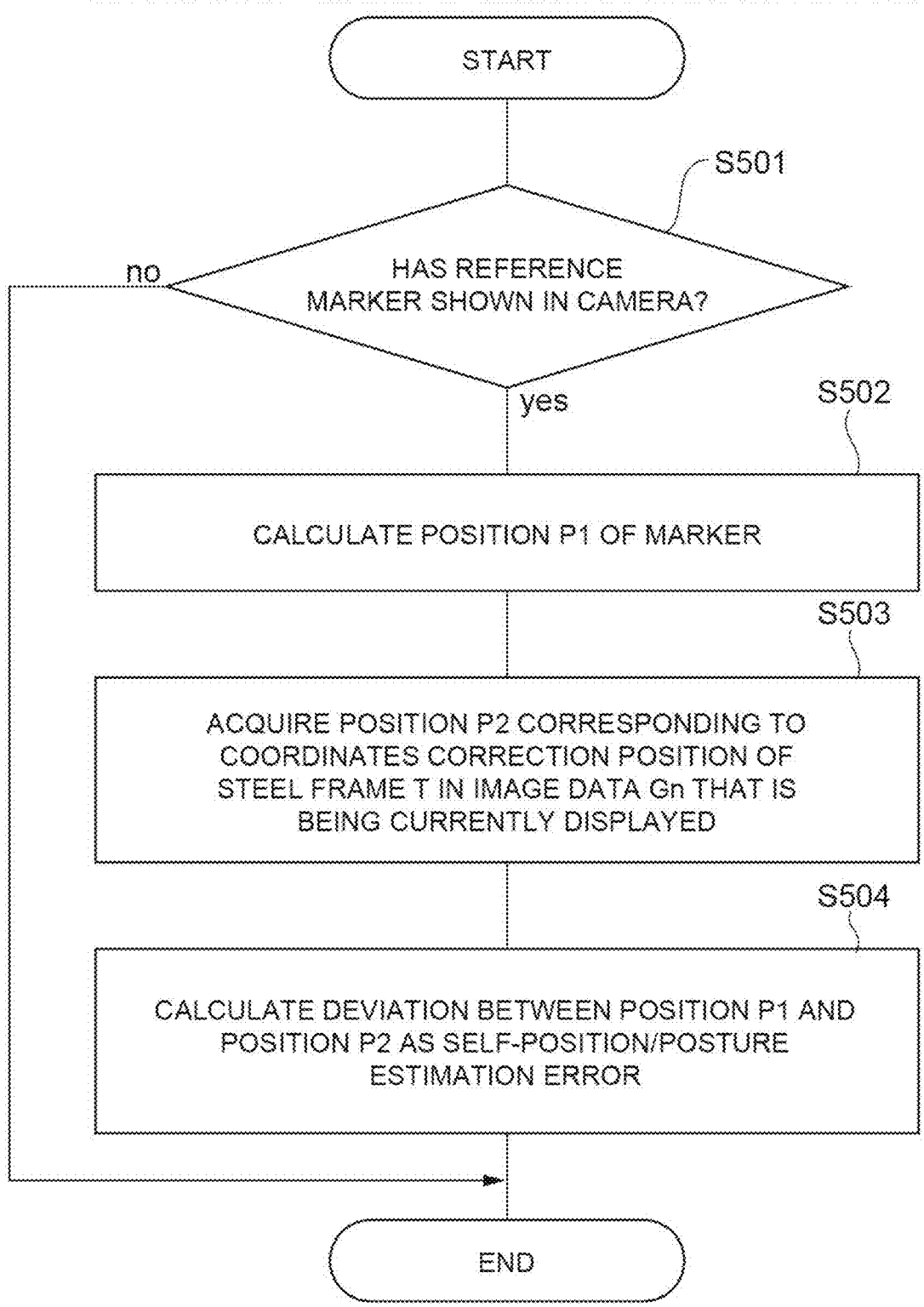
FIG. 9 is a flowchart illustrating a process of calculating a deviation of a coordinates correction position that is performed by a correction processing unit 102.

Next, detailed processes of the process S304 represented in FIG. 7 will be described. FIG. 9 is a flowchart illustrating a process of calculating a deviation of a coordinates correction position that is performed by the correction processing unit 102. FIG. 9 illustrates a process using a reference marker for each part of a steel frame T.

In a case in which a reference marker is shown in an image captured by the camera 101, the correction processing unit 102 calculates a position P1 of the reference marker on the basis of the self-position estimated by the self-position/posture estimating unit 107 (S501 and S502). The correction processing unit 102 has information such as shapes, sizes, and the like of reference markers in advance and can determine a direction and a degree of distance from which capturing has been performed on the basis of a video of the reference markers captured by the camera 101.

In addition, the correction processing unit 102 acquires a position P2 that is a correction correspondence part corresponding to a coordinates correction position of the steel frame T in image data Gn of a decorative material that is being currently displayed (S503). The correction processing unit 102 perceives a correction correspondence part corresponding to a coordinates correction position of a steel frame T and a position thereof in each piece of image data Gn and acquires position information of the correction correspondence part corresponding to the coordinates correction position in the image data Gn to compose a place near the position P1.

The correction processing unit 102 calculates a difference between the position P1 and the position P2 as an estimation error (S504).

In accordance with movement of a user, a deviation between the image data G and the steel frames T occurs. The reason for this is that, although the image data G and the steel frames T, first, are aligned with each other in position using the initial marker, it is difficult to completely align the positions into details, and a position/posture estimation error of SLAM is accumulated in accordance with the movement. Thus, there are cases in which the deviation becomes large in accordance with the movement of a user. The process described above is a process performed when the deviation is calculated.

Figure 10:
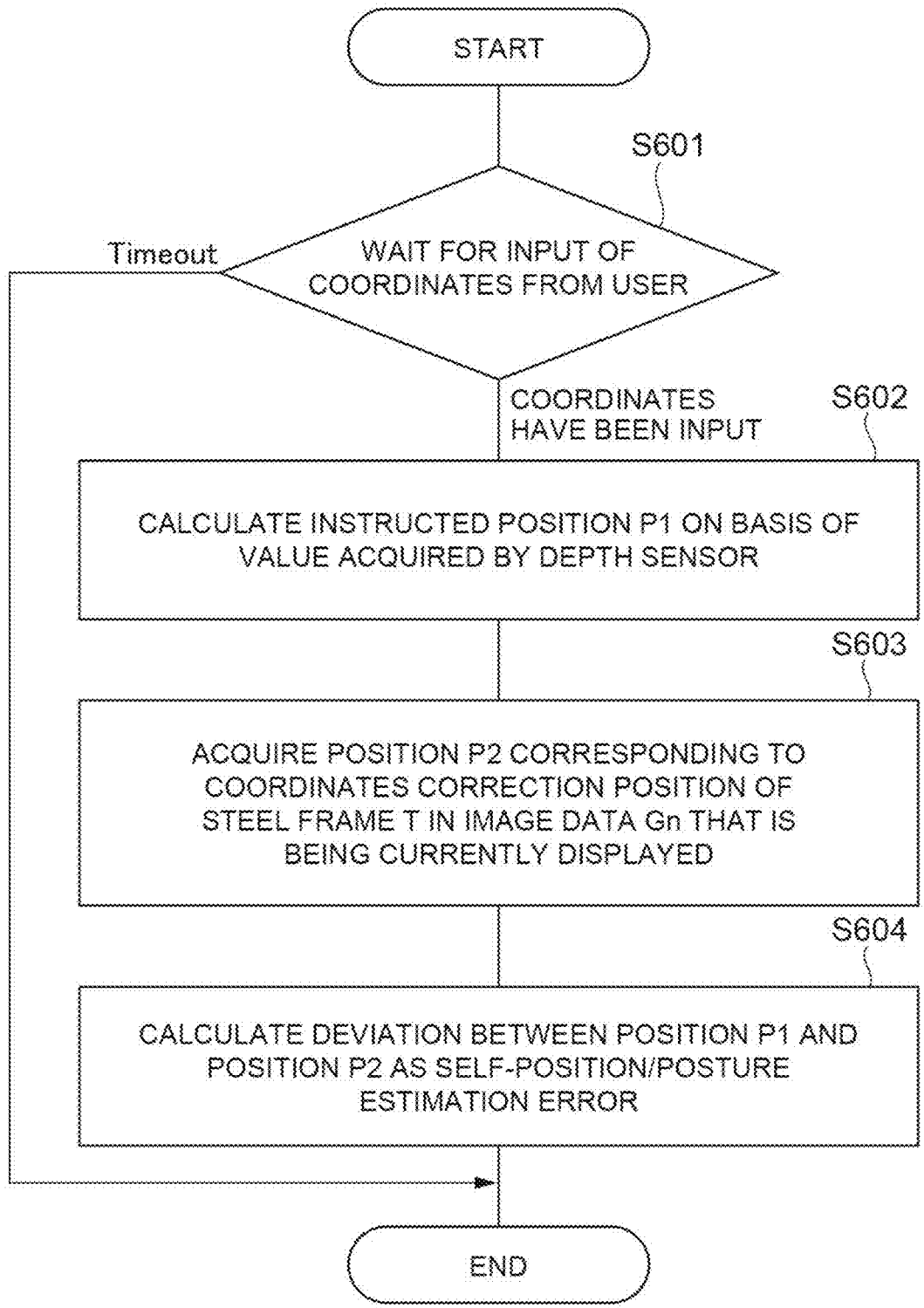
FIG. 10 is a flowchart illustrating another process performed when a positional deviation between image data G and a steel frame T is calculated.
Figure 11:
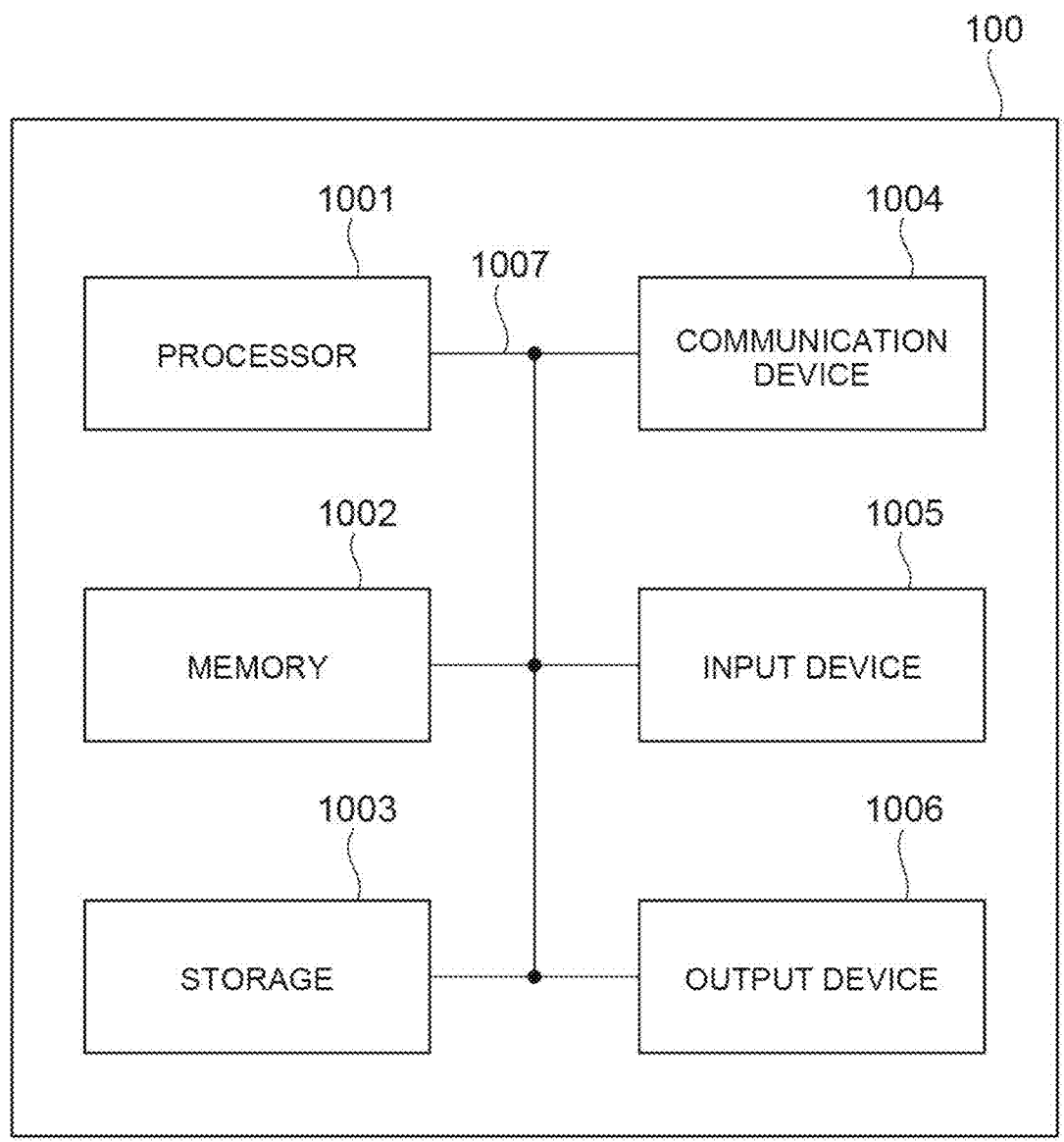
FIG. 11 is a diagram illustrating an example of a hardware configuration of an image display device 100 according to one embodiment of the present disclosure.

Although FIG. 9 described above illustrates the process using reference markers, the reference markers may not be used. FIG. 10 is a flowchart illustrating another process performed when a positional deviation between image data G and steel frames T is calculated.

When an input of coordinates of a coordinates correction position is accepted (S601: Yes), the depth sensor 105 calculates a distance to the coordinates correction position on a steel frame T that is present in a capturing direction of the camera 101 (a sight line direction of a user) and calculates a position P1 (S602). In addition, the correction processing unit 102 acquires a position P2 that is a correction correspondence part corresponding to a coordinates correction position of the steel frame T in the image data G that is being currently displayed (S603). The correction processing unit 102 calculates a difference between the position P1 and the position P2 as an estimation error (S604).

In this way, without using reference markers, the position P1 can be calculated, and a positional deviation on the basis of the position P1 can be calculated.

Next, operations and effects according to one aspect of this embodiment will be described. The image display device 100 according to one aspect of this embodiment is a device that performs imaging using the camera 101 and composes predetermined image data G (including image data G1 to Gn) with a steel frame T that is a composition target object having steel frames T1 to Tn that are a plurality of partial members present in the field of view of a user and displays a result of the composition. This image display device 100 includes the storage unit 103 that stores design data of a steel frame T that is a composition target object, the display unit 104 that generates a composed image acquired by composing image data G representing a predetermined decorative material on the basis of a reference position (a reference marker or a coordinates correction position) in one part of the steel frame T (for example, a steel frame T1 or the like) and displays the composed image, and the correction processing unit 102 that corrects a deviation when the deviation occurs between the image data G and the steel frame T in the field of view of a user U in accordance with movement of the user.

This correction processing unit 102 acquires a coordinates correction position S that becomes a reference position used for a correction process from the steel frame T1 and the like that are partial members using design data stored by the storage unit 103 and a self-position of the user U with respect to the steel frame T.

The correction processing unit 102 performs position alignment of image data G on the basis of the one coordinates correction position S, thereby performing correction.

In accordance with this process, a steel frame Tn can be identified without attaching markers corresponding to parts (steel frames T1 to Tn) of the steel frame T and can compose image data Gn representing a decorative material corresponding to the steel frame Tn.

In this image display device 100, when a coordinates correction position that becomes a reference position used for a correction process is acquired, the correction processing unit 102 acquires a plurality of coordinates correction positions and selects one coordinates correction position satisfying a predetermined condition (for example, being nearest) for the self-position of the user U from among the plurality of coordinates correction positions.

In this way, a more appropriate coordinates correction position can be selected.

In addition, in this embodiment, the predetermined image data G represents a decorative material (a coating member) configure to cover the steel frame T that is a composition target object.

In accordance with this, position alignment between the steel frame T and the image data G can be performed, and a user can visually recognize a building including the decorative material.

In this embodiment, the steel frame T is composed of a plurality of faces. For example, the cross-section thereof has a tetrahedron. The coordinates correction positions are defined on the plurality of faces thereof. When one coordinates correction position S is selected, the correction processing unit 102 selects a coordinates correction position defined on a face having a predetermined angle with respect to a direction for each surface of the steel frame T from the self-position of the user U among surfaces of the plurality of steel frames T.

In this way, a more appropriate coordinates correction position can be selected, and thus composition of image data can be accurately performed.

In this image display device 100, the correction processing unit 102 selects a coordinates correction position that is the nearest from the user U as one coordinates correction position. In this way, an appropriate coordinates correction position can be selected.

In addition, this image display device 100 further includes the depth sensor 105 that measures a distance to the steel frame T. The correction processing unit 102 calculates an actual coordinates correction position using the distance measured by the depth sensor 105. Then, the correction processing unit 102 calculates a deviation between the actual coordinates correction position and a position corresponding to the coordinates correction position S in the image data G composed before correction and performs correction on the basis of the deviation.

In addition, the image display device 100 further includes a recognition unit (not illustrated) that recognizes a marker attached to a composition target object. The correction processing unit 102 calculates an actual coordinates correction position on the basis of the position of the recognized marker. Then, the correction processing unit 102 calculates a deviation between the actual coordinates correction position and a position corresponding to the coordinates correction position in the image data G composed before correction and performs correction on the basis of this deviation.

Correction can be performed on the basis of these deviations.

The block diagram used for the description of the above embodiments shows blocks of functions. Those functional blocks (component parts) are implemented by any combination of at least one of hardware and software. Further, a means of implementing each functional block is not particularly limited. Specifically, each functional block may be implemented by one physically or logically combined device or may be implemented by two or more physically or logically separated devices that are directly or indirectly connected (e.g., by using wired or wireless connection etc.). The functional blocks may be implemented by combining software with the above-described one device or the above-described plurality of devices.

The functions include determining, deciding, judging, calculating, computing, processing, deriving, investigating, looking up/searching/inquiring, ascertaining, receiving, transmitting, outputting, accessing, resolving, selecting, choosing, establishing, comparing, assuming, expecting, considering, broadcasting, notifying, communicating, forwarding, configuring, reconfiguring, allocating/mapping, assigning and the like, though not limited thereto. For example, the functional block (component part) that implements the function of transmitting is referred to as a transmitting unit or a transmitter. In any case, a means of implementation is not particularly limited as described above.

For example, the image display device 100 according to one embodiment of the present disclosure may function as a computer that performs processing of an image process method in an image process according to the present disclosure. FIG. 10 is a view showing an example of the hardware configuration of the image display device 100 according to one embodiment of the present disclosure. The image display device 100 described above may be physically configured as a computer device that includes a processor 1001, a memory 1002, a storage 1003, a communication device 1004, an input device 1005, an output device 1006, a bus 1007 and the like.

In the following description, the term "device" may be replaced with a circuit, a device, a unit, or the like. The hardware configuration of the image display device 100 may be configured to include one or a plurality of the devices shown in the drawings or may be configured without including some of those devices.

The functions of the image display device 100 may be implemented by loading predetermined software (programs) on hardware such as the processor 1001 and the memory 1002, so that the processor 1001 performs computations to control communications by the communication device 1004 and control at least one of reading and writing of data in the memory 1002 and the storage 1003.

The processor 1001 may, for example, operate an operating system to control the entire computer. The processor 1001 may be configured to include a CPU (Central Processing Unit) including an interface with a peripheral device, a control device, an arithmetic device, a register and the like. For example, the correction processing unit 101, the computation processing unit 106, elf-position/posture estimating unit 107, and the like described above may be implemented by the processor 1001.

Further, the processor 1001 loads a program (program code), a software module and data from at least one of the storage 1003 and the communication device 1004 into the memory 1002 and performs various processing according to them. As the program, a program that causes a computer to execute at least some of the operations described in the above embodiments is used. For example, the correction processing unit 102 in the image display device 100 and the like may be implemented by a control program that is stored in the memory 1002 and operates on the processor 1001, and the other functional blocks may be implemented in the same way. Although the above-described processing is executed by one processor 1001 in the above description, the processing may be executed simultaneously or sequentially by two or more processors 1001. The processor 1001 may be implemented in one or more chips. Note that the program may be transmitted from a network through a telecommunications line.

The memory 1002 is a computer-readable recording medium, and it may be composed of at least one of ROM (Read Only Memory), EPROM (Erasable Programmable ROM), EEPROM (Electrically Erasable Programmable ROM), RAM (Random Access Memory) and the like, for example. The memory 1002 may be also called a register, a cache, a main memory (main storage device) or the like. The memory 1002 can store a program (program code), a software module and the like that can be executed for implementing an image processing method according to one embodiment of the present disclosure.

The storage 1003 is a computer-readable recording medium, and it may be composed of at least one of an optical disk such as a CD-ROM (Compact Disk ROM), a hard disk drive, a flexible disk, a magneto-optical disk (e.g., a compact disk, a digital versatile disk, and a Blu-ray (registered trademark) disk), a smart card, a flash memory (e.g., a card, a stick, and a key drive), a floppy (registered trademark) disk, a magnetic strip and the like, for example. The storage 1003 may be called an auxiliary storage device. The above-described storage medium may be a database, a server, or another appropriate medium including the memory 1002 and/or the storage 1003, for example.

The communication device 1004 is hardware (a transmitting and receiving device) for performing communication between computers via at least one of a wired network and a wireless network, and it may also be referred to as a network device, a network controller, a network card, a communication module, or the like. The communication device 1004 may include a high-frequency switch, a duplexer, a filter, a frequency synthesizer or the like in order to implement at least one of FDD (Frequency Division Duplex) and TDD (Time Division Duplex), for example.

The input device 1005 is an input device (e.g., a keyboard, a mouse, a microphone, a switch, a button, a sensor, etc.) that receives an input from the outside. The output device 1006 is an output device (e.g., a display, a speaker, an LED lamp, etc.) that makes output to the outside. Note that the input device 1005 and the output device 1006 may be integrated (e.g., a touch panel).

In addition, the devices such as the processor 1001 and the memory 1002 are connected by the bus 1007 for communicating information. The bus 1007 may be a single bus or may be composed of different buses between different devices.

Further, the image display device 100 may include hardware such as a microprocessor, a DSP (Digital Signal Processor), an ASIC (Application Specific Integrated Circuit), a PLD (Programmable Logic Device), and an FPGA (Field Programmable Gate Array), and some or all of the functional blocks may be implemented by the above-described hardware components. For example, the processor 1001 may be implemented with at least one of these hardware components.

The procedure, the sequence, the flowchart and the like in each of the aspects/embodiments described in the present disclosure may be in a different order unless inconsistency arises. For example, for the method described in the present disclosure, elements of various steps are described in an exemplified order, and it is not limited to the specific order described above.

Input/output information or the like may be stored in a specific location (e.g., memory) or managed in a management table. Further, input/output information or the like can be overwritten or updated, or additional data can be written. Output information or the like may be deleted. Input information or the like may be transmitted to another device.

The determination may be made by a value represented by one bit (0 or 1), by a truth-value (Boolean: true or false), or by numerical comparison (e.g., comparison with a specified value).

Each of the aspects/embodiments described in the present disclosure may be used alone, may be used in combination, or may be used by being switched according to the execution. Further, a notification of specified information (e.g., a notification of "being X") is not limited to be made explicitly, and it may be made implicitly (e.g., a notification of the specified information is not made).

Although the present disclosure is described in detail above, it is apparent to those skilled in the art that the present disclosure is not restricted to the embodiments described in this disclosure. The present disclosure can be implemented as a modified and changed form without deviating from the spirit and scope of the present disclosure defined by the appended claims. Accordingly, the description of the present disclosure is given merely by way of illustration and does not have any restrictive meaning to the present disclosure.

Software may be called any of software, firmware, middleware, microcode, hardware description language or another name, and it should be interpreted widely so as to mean an instruction, an instruction set, a code, a code segment, a program code, a program, a sub-program, a software module, an application, a software application, a software package, a routine, a sub-routine, an object, an executable file, a thread of execution, a procedure, a function and the like.

Further, software, instructions and the like may be transmitted and received via a transmission medium. For example, when software is transmitted from a website, a server or another remote source using at least one of wired technology (a coaxial cable, an optical fiber cable, a twisted pair and a digital subscriber line (DSL) etc.) and wireless technology (infrared rays, microwave etc.), at least one of those wired technology and wireless technology are included in the definition of the transmission medium.

The information, signals and the like described in the present disclosure may be represented by any of various different technologies. For example, data, an instruction, a command, information, a signal, a bit, a symbol, a chip and the like that can be referred to in the above description may be represented by a voltage, a current, an electromagnetic wave, a magnetic field or a magnetic particle, an optical field or a photon, or an arbitrary combination of them.

Note that the term described in the present disclosure and the term needed to understand the present disclosure may be replaced by a term having the same or similar meaning. For example, at least one of a channel and a symbol may be a signal (signaling). Further, a signal may be a message. Furthermore, a component carrier (CC) may be called a cell, a frequency carrier, or the like.

The terms "system" and "network" used in the present disclosure are used to be compatible with each other.

Information, parameters, and the like described in the present disclosure may be represented using absolute values, may be represented using relative values from predetermined values, or may be represented using other information corresponding thereto. For example, a wireless resource may be indicated using an index.

The names used for the above-described parameters are not definitive in any way.

Note that the term "determining" and "determining" used in the present disclosure includes a variety of operations. For example, "determining" and "determining" can include regarding the act of judging, calculating, computing, processing, deriving, investigating, looking up/searching/inquiring (e.g., looking up in a table, a database or another data structure), ascertaining or the like as being "determined" and "determined". Further, "determining" and "determining" can include regarding the act of receiving (e.g., receiving information), transmitting (e.g., transmitting information), inputting, outputting, accessing (e.g., accessing data in a memory) or the like as being "determined" and "determined". Further, "determining" and "determining" can include regarding the act of resolving, selecting, choosing, establishing, comparing or the like as being "determined" and "determined". In other words, "determining" and "determining" can include regarding a certain operation as being "determined" and "determined". Further, "determining (determining)" may be replaced with "assuming", "expecting", "considering" and the like.

The term "connected", "coupled" or every transformation of this term means every direct or indirect connection or coupling between two or more elements, and it includes the case where there are one or more intermediate elements between two elements that are "connected" or "coupled" to each other. The coupling or connection between elements may be physical, logical, or a combination of them. For example, "connect" may be replaced with "access". When used in the present disclosure, it is considered that two elements are "connected" or "coupled" to each other by using at least one of one or more electric wires, cables, and printed electric connections and, as several non-definitive and non-comprehensive examples, by using electromagnetic energy such as electromagnetic energy having a wavelength of a radio frequency region, a microwave region and an optical (both visible and invisible) region.

The description "on the basis of" used in the present disclosure does not mean "only on the basis of" unless otherwise noted. In other words, the description "on the basis of" means both of "only on the basis of" and "at least on the basis of".

Furthermore, "means" in the configuration of each device described above may be replaced by "unit", "circuit", "device" or the like.

As long as "include", "including" and transformation of them are used in the present disclosure, those terms are intended to be comprehensive like the term "comprising". Further, the term "or" used in the present disclosure is intended not to be exclusive OR.

In the present disclosure, when articles, such as "a", "an", and "the" in English, for example, are added by translation, the present disclosure may include that nouns following such articles are plural.

In the present disclosure, the term "A and B are different" may mean that "A and B are different from each other". Note that this term may mean that "A and B are different from C". The terms such as "separated" and "coupled" may be also interpreted in the same manner.

REFERENCE SIGNS LIST

100 Image display device
101 Camera
102 correction processing unit
103 storage unit
104 display unit
105 depth sensor
106 computation processing unit
107 self-position/posture estimating unit

The invention claimed is:

1. An image display device that composes and displays a predetermined image for a composition target object present in a reality space, the image display device comprising:
   circuitry configured to
      store, in a memory, design data representing a positional relation between parts of the composition target object;
      generate and display a composed image acquired by composing a predetermined image using one part of the composition target object as a reference position; and correct a deviation between the predetermined image and the composition target object that occurs in accordance with movement of a user, wherein the circuitry acquires a coordinates correction position that becomes a reference position used for a correction process in the one part of the composition target object using the design data and a self-position of the user with respect to the composition target object and corrects a composition position of the predetermined image on the basis of the coordinates correction position, wherein, when the coordinates correction position that becomes the reference position used for the correction process is acquired, the circuitry acquires a plurality of coordinates correction positions and selects one coordinates correction position satisfying a predetermined condition for the self-position of the user from the plurality of coordinates correction positions.

2. The image display device according to claim 1, wherein the predetermined image represents a coating member configured to cover the composition target object.

3. The image display device according to claim 2, further comprising a sensor configured to measure a distance to the composition target object, wherein the circuitry calculates an actual coordinates correction position using the distance measured by the sensor, calculates a deviation between the actual coordinates correction position and a part corresponding to the coordinates correction position in an image composed before correction, and performs correction on the basis of the deviation.

4. The image display device according to claim 2, wherein the circuitry is configured to recognize a marker attached to a composition target object, and wherein the circuitry calculates an actual coordinates correction position on the basis of a position of the recognized marker, calculates a deviation between the actual coordinates correction position and a part corresponding to the coordinates correction position in an image composed before correction, and performs correction on the basis of the deviation.

5. The image display device according to claim 1, further comprising a sensor configured to measure a distance to the composition target object, wherein the circuitry calculates an actual coordinates correction position using the distance measured by the sensor, calculates a deviation between the actual coordinates correction position and a part corresponding to the coordinates correction position in an image composed before correction, and performs correction on the basis of the deviation.

6. The image display device according to claim 1, wherein the circuitry is configured to recognize a marker attached to a composition target object, and wherein the circuitry calculates an actual coordinates correction position on the basis of a position of the recognized marker, calculates a deviation between the actual coordinates correction position and a part corresponding to the coordinates correction position in an image composed before correction, and performs correction on the basis of the deviation.

7. The image display device according to claim 1, wherein the predetermined image represents a coating member configured to cover the composition target object.

8. The image display device according to claim 1, wherein, when the one coordinates correction position is selected, the circuitry selects a coordinates correction position defined in a composition target object having a predetermined angle with respect to a direction for each composition target object from the self-position of the user among a plurality of composition target objects.

9. The image display device according to claim 8, wherein the circuitry selects a coordinates correction position that is the nearest from the user as the one coordinates correction position.

10. The image display device according to claim 9, further comprising a sensor configured to measure a distance to the composition target object, wherein the circuitry calculates an actual coordinates correction position using the distance measured by the sensor, calculates a deviation between the actual coordinates correction position and a part corresponding to the coordinates correction position in an image composed before correction, and performs correction on the basis of the deviation.

11. The image display device according to claim 9, wherein the circuitry is configured to recognize a marker attached to a composition target object, and wherein the circuitry calculates an actual coordinates correction position on the basis of a position of the recognized marker, calculates a deviation between the actual coordinates correction position and a part corresponding to the coordinates correction position in an image composed before correction, and performs correction on the basis of the deviation.

12. The image display device according to claim 8, further comprising a sensor configured to measure a distance to the composition target object, wherein the circuitry calculates an actual coordinates correction position using the distance measured by the sensor, calculates a deviation between the actual coordinates correction position and a part corresponding to the coordinates correction position in an image composed before correction, and performs correction on the basis of the deviation.

13. The image display device according to claim 8, wherein the circuitry is configured to recognize a marker attached to a composition target object, and wherein the circuitry calculates an actual coordinates correction position on the basis of a position of the recognized marker, calculates a deviation between the actual coordinates correction position and a part corresponding to the coordinates correction position in an image composed before correction, and performs correction on the basis of the deviation.

14. A method, implemented by circuitry of an image display device that composes and displays a predetermined image for a composition target object present in a reality space, the method comprising:

storing, in a memory, design data representing a positional relation between parts of the composition target object;

generating and displaying a composed image acquired by composing a predetermined image using one part of the composition target object as a reference position; and correcting a deviation between the predetermined image and the composition target object that occurs in accordance with movement of a user, wherein the method further includes acquiring a coordinates correction position that becomes a reference position used for a correction process in the one part of the composition target object using the design data and a self-position of the user with respect to the composition target object and corrects a composition position of the predetermined image on the basis of the coordinates correction position,
wherein, when the coordinates correction position that becomes the reference position used for the correction process is acquired, the circuitry acquires a plurality of coordinates correction positions and selects one coordinates correction position satisfying a predetermined condition for the self-position of the user from the plurality of coordinates correction positions.

* * * * *